US012671925B2

(12) United States Patent
Thome

(10) Patent No.: US 12,671,925 B2
(45) Date of Patent: Jun. 30, 2026

(54) SOUND SYSTEM FOR A POOL AND POOL EQUIPPED WITH SUCH A SYSTEM

(71) Applicants: Jean-Philippe Thome, Clermont-Ferrand (FR); Sébastien Pascal, Castillon du Gard (FR); Sophie Morice, Antibes Juan les Pins (FR)

(72) Inventor: Jean-Philippe Thome, Clermont-Ferrand (FR)

(73) Assignee: ACOUDESIGN, Clermont-Ferrand (FR)

(*) Notice: Subject to any disclaimer, the term of this patent is extended or adjusted under 35 U.S.C. 154(b) by 106 days.

(21) Appl. No.: 18/736,733

(22) Filed: Jun. 7, 2024

(65) Prior Publication Data

US 2024/0422460 A1 Dec. 19, 2024

(30) Foreign Application Priority Data

Jun. 13, 2023 (EP) .................................... 23179067

(51) Int. Cl.
*H04R 1/44* (2006.01)
*H04R 1/02* (2006.01)

(52) U.S. Cl.
CPC ............... *H04R 1/025* (2013.01); *H04R 1/44* (2013.01)

(58) Field of Classification Search
CPC .................................. H04R 1/025; H04R 1/44
See application file for complete search history.

(56) References Cited

U.S. PATENT DOCUMENTS

2016/0286308 A1* 9/2016 Chen ........................ H04R 1/02
2018/0048949 A1* 2/2018 Chen ...................... H04R 1/023

FOREIGN PATENT DOCUMENTS

FR 3098833 A1 * 1/2021 ........... H04R 1/2811
KR 20220057811 A * 5/2022 ............... H04R 1/44

* cited by examiner

*Primary Examiner* — Joseph Saunders, Jr.

(57) ABSTRACT

A sound system for a pool has at least a first wall and a second wall, one of which is intended to be at least partially submerged in the pool and the other to be above water, a first and a second electroacoustic transducer attached to the first and second walls, respectively, and a control unit configured to control and power the first and second electroacoustic transducers. The control unit has a radio-frequency communication module, including at least one antenna arranged in the sound system in such a way that the antenna is at least partly above a waterline of the pool.

9 Claims, 4 Drawing Sheets

SOUND SYSTEM FOR A POOL AND POOL EQUIPPED WITH SUCH A SYSTEM

TECHNICAL FIELD

The invention relates to the field of sound systems, and in particular to the sound systems of bodies of water such as pools.

More particularly, the invention is concerned with a sound system for a pool and a pool equipped with such a sound system.

PRIOR ART

It is known from FR 3098833 A1 to supply sound systems for swimming pools. Such systems, based on the use of electroacoustic transducers, such as the one taught in document WO 2022/008685 A1, make it possible to provide a sound ambiance both in the aerial environment of the pool, via its above-the-waterline part, and in the aquatic environment of the pool, via its below-the-waterline part.

So, while such pool sound systems can provide good pool sound, they have the disadvantage of generally needing to be wired to a sound source. However, the aquatic configuration does not allow for truly efficient wired operation.

EXPLANATION OF THE INVENTION

The invention aims to remedy this drawback and thus aims to provide a pool sound system that allows an optimized wireless connection to enable wireless transmission of audio signals to the sound system.

To this end, the invention relates to a pool sound system comprising:

- at least a first wall and a second wall, the first and second walls being arranged in such a way that, when the sound system is in use, one of the first and second walls is at least partly submerged in the pool, while the other of the first and second walls is above water,
- a first electroacoustic transducer attached to the first wall and a second electroacoustic transducer attached to the second wall,
- a control unit configured to control and power the first and second electroacoustic transducers,
- wherein the control unit comprises a radio-frequency communication module, such as a Bluetooth™ or wifi™ communication module, including at least one antenna arranged in the sound system in such a way that the antenna is at least partly above a waterline of the pool when the sound system is arranged at least partly in the pool.

In contrast to the prior art, the sound system according to the invention allows, due to the arrangement of the antenna at least partly above a waterline of the pool, a wireless connection which is not, or only slightly, affected by the surrounding water of the pool. As a result, the wireless connection offered by the communication module can be reliable and less energy-consuming than prior art pool sound systems offering such a wireless connection.

The term "pool" is used here and throughout this document to mean any type of body of water, water pool or water reservoir, whether or not it is suitable for bathing or swimming, whether or not it is for public or private use, whatever its shape and/or dimensions and/or materials, and whether it is natural, such as a lake, pool or inlet, or artificial, such as a swimming pool or bathtub. Non-limiting examples include in-ground pools, semi-in-ground pools, above-ground pools, public pools, hot tubs, basins or counter-current or non-counter-current swimming lanes. The term "pool" is also used to designate pools for decorative purposes or for animals such as fish, birds or aquatic mammals.

The sound system can be buoyant and can have at least a first waterline when arranged in the pool,

- the antenna being arranged at least partly above the first waterline of the sound system.

With such a buoyancy characteristic, the system is able to play a central role in the sound system of the pool, without this having any significant influence on the wireless communication capabilities of the sound system of the invention.

The sound system can have at least a first configuration wherein the first wall is at least partly submerged, the second wall being above water, and a second configuration wherein the first wall is partly above water, the second wall being at least partly submerged, the sound system having:

- the first waterline when arranged in the pool in the first configuration, and
- a second waterline when arranged in the pool in the second configuration, the at least one antenna being arranged so as to present:
- a first portion above the first waterline when the sound system is arranged in the pool in the first configuration, and
- a second portion, separate from or partly coinciding with the first portion, above the second waterline when the sound system is arranged in the pool in the second configuration.

With this configuration, the user does not need to worry about the configuration of the sound system, since the antenna provides an effective wireless connection whatever the configuration.

The control unit may comprise a signal processing module configured to receive an audio signal from the wireless communication module and to apply different audio processing to the signal between the first and second transducers so as to provide a control audio signal with processing adapted to the aquatic environment to whichever transducer, either the first or second, is associated with whichever wall, either the first or second, is at least partly below the waterline.

In this way, the sound transmitted in the above-the-waterline and aquatic environments of the pool is optimized.

The processing module can have a first processing configuration wherein the control audio signal is transmitted to the first transducer with processing adapted to the aquatic environment, and a second processing configuration wherein the control audio signal is transmitted to the second transducer with processing adapted to the aquatic environment.

In this way, optimal sound transmission can be achieved in both the first and second configurations of the sound system.

The control module may comprise at least one sensor capable of detecting whichever of the configurations, first or second, the sound system is in, and the sound system and processing module being configured to:

- switch from the first processing configuration to the second processing configuration when the sensor detects that the sound system has switched from the first configuration to the second configuration, and
- switch from the second processing configuration to the first processing configuration when the sensor detects that the sound system has switched from the second configuration to the first configuration.

With such a sensor, the user doesn't have to worry about the configuration wherein the sound system is located, as it adapts the control audio signal of the first and second transducers depending on the configuration it is in.

The control module may comprise at least one internal energy source capable of providing an electrical supply to power the rest of the control module, the energy source being preferably rechargeable.

In this way, as the system is able to operate completely independently and does not need to be wired to an audio source, it can be moved around the pool without constraint.

The internal power source may be rechargeable and the control module may comprise at least one of:

- a solar charging system, such as a solar panel,
- an inductive charging system.

In this way, the recharging of the sound system can be simplified by being provided either by sunlight, or by a wireless recharging base on which the system can simply be placed to enable such recharging.

At least one of the first and second walls is equipped with an illumination system, such as a lighting system, said at least one of the first and second walls (equipped) being preferably a wall intended to be submerged so as to allow illumination of a bottom of the pool.

Such lighting can provide a visual ambiance to the pool that complements the sound ambiance already provided by the sound system according to the invention.

The invention also relates to a pool comprising a sound system according to the invention.

Such a pool may benefit from the advantages of the system according to the invention which equips it.

BRIEF DESCRIPTION OF THE DRAWINGS

The present invention will be better understood on reading the description of example embodiments, given purely by way of illustration and in no way limiting, with reference to the appended drawings wherein.

Identical, similar, or equivalent parts of the various figures bear the same numerical references, so that it is easier to browse from one figure to another.

For the sake of readability, the different parts shown in the figures are not necessarily on a uniform scale.

The various possibilities (variants and realization modes) should be understood as not being mutually exclusive and can be combined with each other.

Note that the relative terms "top", "bottom", "above", "below", "above water", "submerged" are used in relation to the layout of the sound system while in use on or in the pool. Thus, in the embodiment described herein, wherein the sound system is a floating system, it is the arrangement of the sound system floating in the pool water, the wall intended to be above water being a wall of the system not in contact with the pool water (i.e. the surface) when the sound system is floating in the pool, the wall intended to be at least partially submerged being the wall of the system in contact with the pool water (i.e. the surface) when the sound system is floating in the pool. The "above", "below", "top" and "bottom" reference frames are thus linked to the reference frames of the sound system in this usage configuration.

A DETAILED DESCRIPTION OF SPECIFIC EMBODIMENTS

Figure 1:
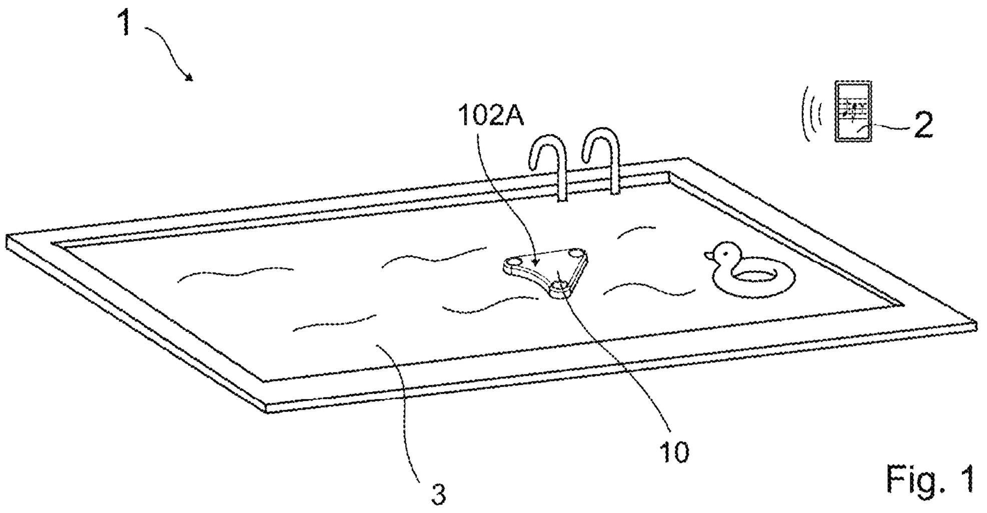
FIG. 1 shows a pool equipped with a sound system according to a first embodiment of the invention.

FIG. 1 illustrates a pool equipped with a sound system 10, according to a first embodiment of the invention, to provide sound for both the above-the-waterline and aquatic environments of a pool 1, in this case a private swimming pool.

It should be noted that although the sound system 10 in the present embodiment, as shown in FIG. 1, is a floating system, it can, in a manner similar to that taught in document FR 3098833 A1 and as described below in the context of the second embodiment, be suitable for arrangement on an edge of a pool 1 without being floating.

Figure 2:
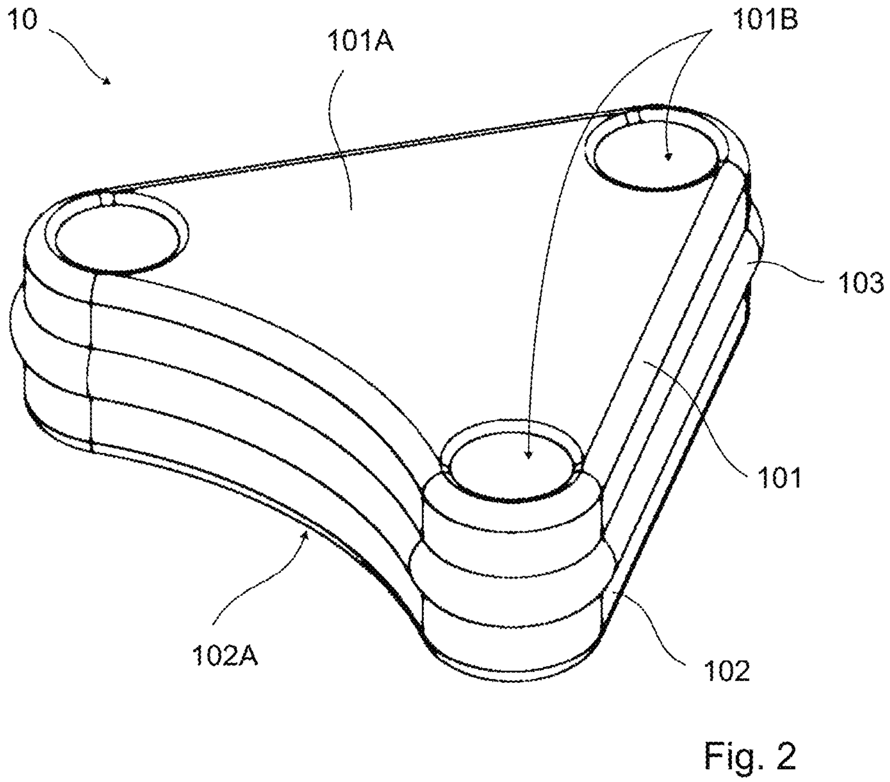
FIG. 2 shows a perspective view of the sound system shown in FIG. 1.
Figure 3:
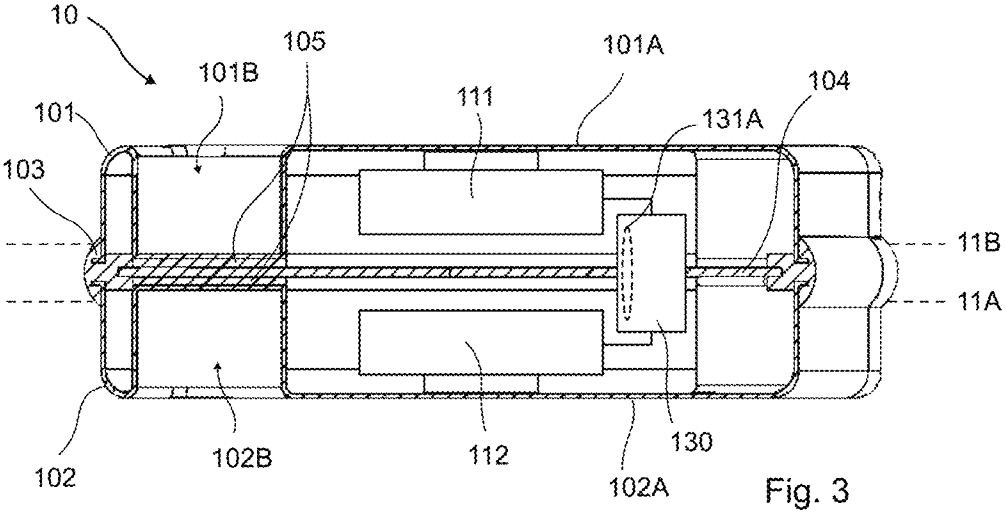
FIG. 3 shows a side-section view of the sound system shown in FIGS. 1 and 2.
Figure 4:
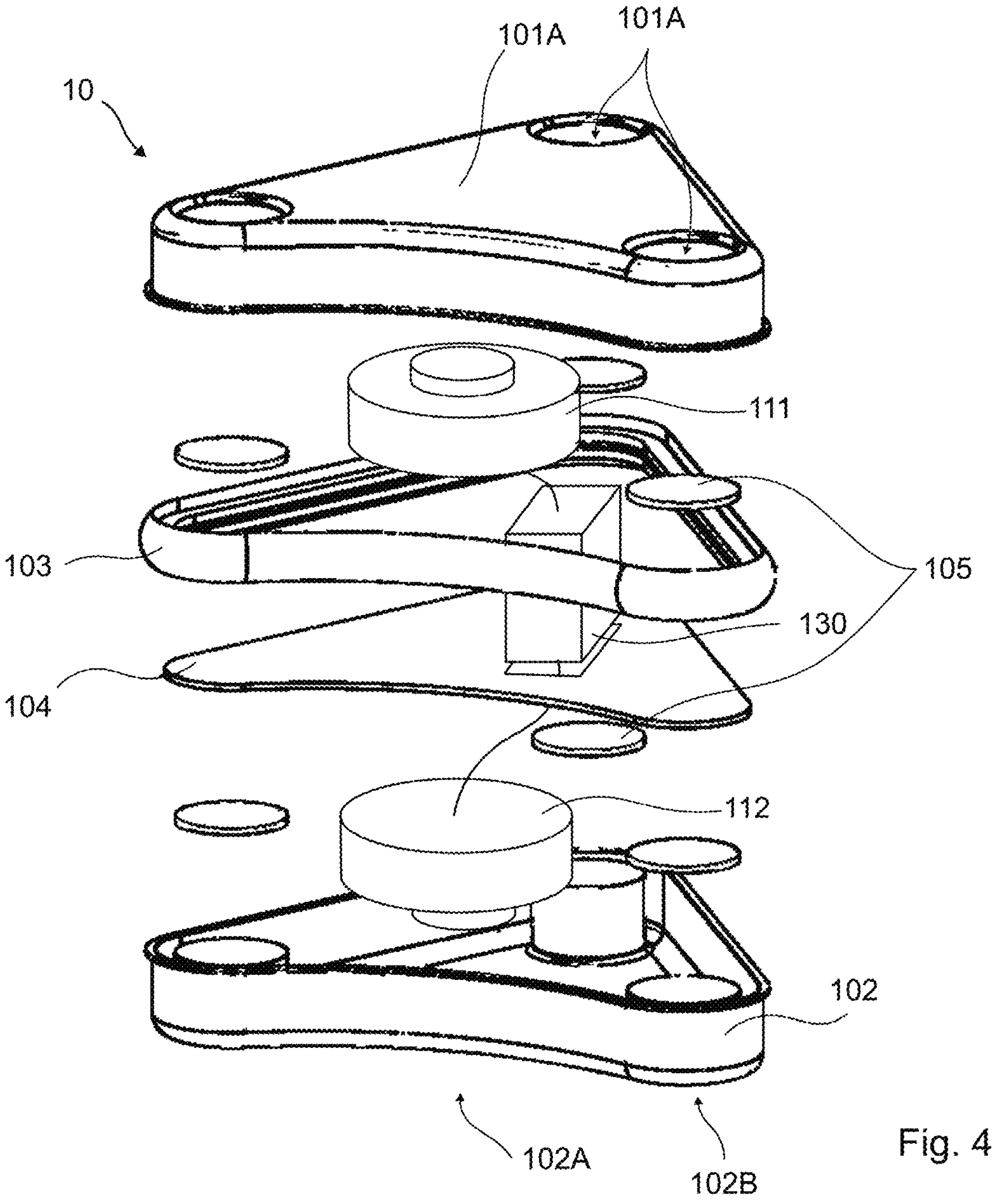
FIG. 4 shows an exploded view of the sound system shown in FIGS. 1 to 3.

As shown in FIGS. 2 to 4, the sound system 10 according to the invention comprises:

- at least one first wall 101A,
- at least one second wall 102A,
- a first electroacoustic transducer 111 attached to the first wall 101 so as to transmit sound into the water of the pool, and a second electroacoustic transducer 112 attached to the second wall 102,
- a control unit 130 configured to control and power the first and second electroacoustic transducers 111, 112.

The first and second walls 101A, 102A are arranged in such a way that, when the sound system 10 is in use, either the first of second wall 101A, 102A is at least partially submerged in the pool 1, while the other of the first and second walls 101A, 102A is above water. FIG. 1 shows that it is the second wall 102A that is above water.

The control unit 130 comprises a radio-frequency communication module 131, such as a Bluetooth™ or wifi™ communication module, including at least one antenna 131A arranged in the sound system in such a way that the antenna is at least partly above a waterline 3 of the pool when the sound system is arranged at least partly in the pool 1.

This ensures that wireless communication between the control unit 130, i.e. the sound system 10, and a source of sound 2, in this case a cell phone belonging to a user of the sound system 10, is minimized by the influence of the water in the pool 1.

In the present embodiment of the invention, the sound system 10 takes the general shape of a polyhedron of the right prism type, and more specifically of the triangular right prism type. As shown in FIG. 2, the triangular bases of the sound system 10 form the first and second walls 101A, 102A respectively. The sound system according to this first embodiment also comprises cavities 101B, 102B on both its first and second walls 101A, 102A, at the three vertices of the triangular bases. These cavities are, in the case of the wall 102A, cup-holder cavities 102B, each designed to receive a glass. With such an arrangement, the sound system 10 forms a floating bar that can accommodate the glasses of three users without risk of spillage.

As shown in FIGS. 3 and 4, the sound system 10 according to the invention more specifically comprises:

- a first and a second shell 101, 102 of generally semi-polyhedral shape of the triangular prism type, with one of the triangular bases open, the other base forming the first and second walls 101A, 102A respectively, said first and second shells 101, 102 each having cavities 101B, 102B, those of the second shell 102 forming a cup holder, a triangular central gasket 103, shaped to seal the first and second shells 101, 102 together at their open bases, a central support plate 104 held in the center of the sound system 10 by the central gasket 103 to support the control unit 130, retaining pads 105, arranged on either side of the central support plate at each of the vertices of the triangle and cavities 101B, 102B resting against the bottom of cavities 101B, 102B in such a way that pads 105 are held against the central support plate 105 by said cavities, the first and second electro-acoustic transducers 111, 112 attached to the first and second walls 101A, 102A respectively, the control unit 130 supported by the central plate 104.

The materials of the various components of the system, and in particular the first and second shells 101, 102 and the central gasket 103, are preferably chosen to be compatible with use in a humid environment, particularly advantageously in a chlorinated humid environment. In this way, the first and second shells 101, 102 can both be made of a waterproof polymer that is neutral to water and chlorinated media, such as PVC (polychlorovinyl) or acrylic. The central gasket 103 is preferably made of an elastomer that is neutral to water and chlorinated media, such as silicone, ethylene propylene diene monomer (EPDM), nitrile (NBR) or fluoroelastomer.

In the present embodiment, as shown in FIG. 3, the sound system has at least a first configuration, wherein the first wall 101A is at least partly submerged, with the second wall 102A above water (configuration shown in FIG. 1), and a second configuration, wherein the first wall 101A is above water, with the second wall 102A at least partly submerged. According to this variant, the sound system 10 has:

a first waterline 11A when arranged in the pool in the first configuration, and a second waterline 11B when arranged in the pool in the second configuration.

The term "waterline" is used here and in the rest of this document, in accordance with the definition given in the marine field, to mean the line separating the submerged part of the sound system 10 from the part which is above water.

According to one variant of the invention, the at least one antenna 131A can be arranged so as to have:

a first portion above the first waterline when the sound system 10 is arranged in the pool in the first configuration, and a second portion, separate from or partly coinciding with the first portion, above the second waterline when the sound system 10 is arranged in the pool in the second configuration.

Of course, although the presence of such a first and second portion can be obtained by means of an antenna extending on both sides of the first and second waterline 11A, 11B as shown in FIG. 3, it is also conceivable, according to a non-shown variant and without departing from the scope of the invention, for the wireless communication module to comprise two antennas, a first antenna arranged in the first configuration of the sound system 10 above the first waterline 11A, and a second antenna arranged in the second configuration of the sound system 10 above the second waterline 11A.

Of course, in a so-called "simplified" configuration of the sound system 10 according to the present embodiment, the sound system may comprise only a single arrangement configuration wherein the first wall 101A is intended to be at least partly, and preferably entirely, submerged, and the second wall 102A is intended to be above water. According to this variant, the cavities 101B on the first wall 101A, the one intended to be at least partially submerged, may comprise a piece of equipment from the sound system 10, such as the lighting system discussed later in this document.

Figure 5:
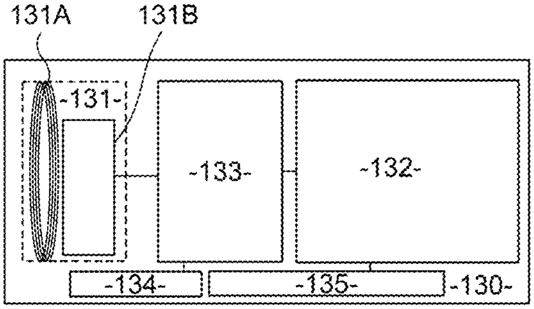
FIG. 5 is a block diagram of a control module for the sound system shown in FIGS. 1 to 4.

FIG. 5 shows a block diagram of the control unit 130. As shown, the control unit may comprise:

the connection module 131 in order to enable a wireless connection, such as by Bluetooth™ or wifi™, with a sound source in order to retrieve at least one audio signal to be broadcast, the connection module 131 comprising the at least one antenna 131A and a connection module 131B, such as a Bluetooth™ or wifi™ connection module, a processing module 133 able to recover the audio signal supplied by the connection module 131 and to process it in order to supply a control audio signal to the first and second transducer based on the audio signal, an internal power source 132 capable of providing a power supply to power the remainder of the control module 130, the internal power source 132 being a rechargeable power source, such as one or more lithium-based batteries, a sensor 134 capable of detecting which of the first and second configurations the sound system 10 is in, and wherein the sound system is located, an inductive charging system 135, configured to enable wireless recharging of the energy source.

Of course, while the energy source is preferably rechargeable, alternatively and without departing from the scope of the invention, it can be based on one or more non-rechargeable batteries. Similarly, it is perfectly conceivable, without going beyond the scope of the invention and in a non-advantageous way, that the energy source is external, the system then being wired to this energy source, such as a city power grid.

Likewise, while an inductive charging system 135 is advantageous, it is also possible, without going beyond the scope of the invention, that, additionally or alternatively, the sound system 10 has a connector, preferably waterproof, to enable the internal power source 132 to be recharged by wire.

Similarly, as an alternative or in addition to an inductive charging system 135, the sound system 10 may comprise a solar charging system, such as a solar panel. Such a solar panel can be arranged on at least one of the first and second walls 101A, 102A, advantageously intended to be raised when the sound system 10 is installed in the pool 1. According to one variant, each of the first and second walls 101A, 102A can be equipped with a solar panel. Of course, according to this variant of the invention, said solar panel(s) are flush with the surface of the wall 101A, 102A that they equip or are arranged at a portion of said wall 101A, 102A that is substantially transparent in a light frequency range wherein said solar panel(s) are likely to absorb light.

According to one variant of the invention, not shown, the control unit 130 can also be configured to control the lighting system, such as one or more light-emitting diodes, fitted to at least one of the first and second walls 101A, 102A. This lighting system is preferably fitted to a wall 101A, 102A designed to be submerged so as to illuminate a pool floor. It is therefore perfectly conceivable for the lighting system to be fitted to the first and second walls 101A, 102A when the sound system has two configurations. According to this variant, the lighting system can be configured to illuminate only one of the first and second walls 101A, 102A, based on an indication of the configuration of the sound system 10 provided by the sensor 134. In the simplified configuration of the sound system 10, the lighting system can be fitted in the cavities 101B of the first shell 101.

According to that variant of the invention wherein the system comprises a lighting system, the control unit 130 can also be configured to control the lighting system, this control can be based on the audio signal retrieved from the connection module 131, the provided lighting changing its intensity, color, and/or direction, depending on the broadcast sound signal.

According to one variant of the invention, the processing module 133 may be configured to receive the audio signal from the wireless communication module 131 and to apply different audio processing to the audio signal between the first and second transducers so as to provide a control audio signal with processing adapted to the aquatic environment to whichever transducer, either the first or second 111, 112, is associated with whichever wall, either the first or second 101A, 101B, is at least partly below the waterline. Such a configuration may be based on the indication of the configuration of the sound system 10 provided by the sensor 134.

Specifically, the processing module 133 can have a first processing configuration wherein the control audio signal is transmitted to the first transducer 111 with processing adapted to the aquatic environment, and a second processing configuration wherein the control audio signal is transmitted to the second transducer 111 with processing adapted to the aquatic environment. Of course, according to this variant, in the first processing configuration, the control audio signal transmitted to the second transducer 112 has processing adapted to the above-the-waterline environment (or without processing other than simple amplification), and in the second processing configuration, the control audio signal transmitted to the first transducer 111 has processing adapted to the above-the-waterline environment (or without processing other than simple amplification).

According to this same variant, the processing module (133) can be further configured to:

- switch from the first processing configuration to the second processing configuration when the sensor 134 detects that the sound system 10 has switched from the first configuration to the second configuration, and
- switch from the second processing configuration to the first processing configuration when the sensor 134 detects that the sound system 10 has switched from the second configuration to the first configuration.

Similarly, according to one variant of the invention, the control unit 130 may be able to receive a plurality of audio signals, at least a first and a second audio signal, and the processing module 133 may be able to supply, via the processing module 133, a first audio control signal to the first electroacoustic transducer 111 based on the first audio signal and a second audio control signal to the second electroacoustic transducer 112 based on the first audio signal. Of course, according to the principle already explained above, the audio control signal for the electroacoustic transducer 111, 112 associated with the at least partially submerged wall 101A, 102A can be processed in a way suitable for the aquatic environment.

It should be noted that while in the context of the present illustrations of the sound system 10 according to the invention, in particular those of FIGS. 3 and 4, the control unit 130 is depicted in the form of a parallelepiped housing, of course in the context of a practical arrangement of the system according to the invention, the arrangement may be different. Thus, in a usual configuration, wherein the processing module 133 may be provided in the form of one or more printed circuit boards associated with one or more batteries, said board(s) and battery(ies) may, for example, be arranged in contact with the central support plate 104. According to this variant, the control unit may comprise one or two antennas arranged close to at least one of the first and second walls 101A, 102A, which is a wall that is intended to be above water.

It should also be noted that, while in the present embodiment the sound system 10 is provided in the form of a single housing, it is also conceivable, without departing from the scope of the invention, for the sound system 10 to comprise a plurality of interconnected housings. According to this variant, for example, the system may comprise a first housing, comprising the first wall 101A, which is intended to be totally or partially submerged, and a second housing, comprising the second wall 102A, which is intended to remain submerged.

Figure 6:
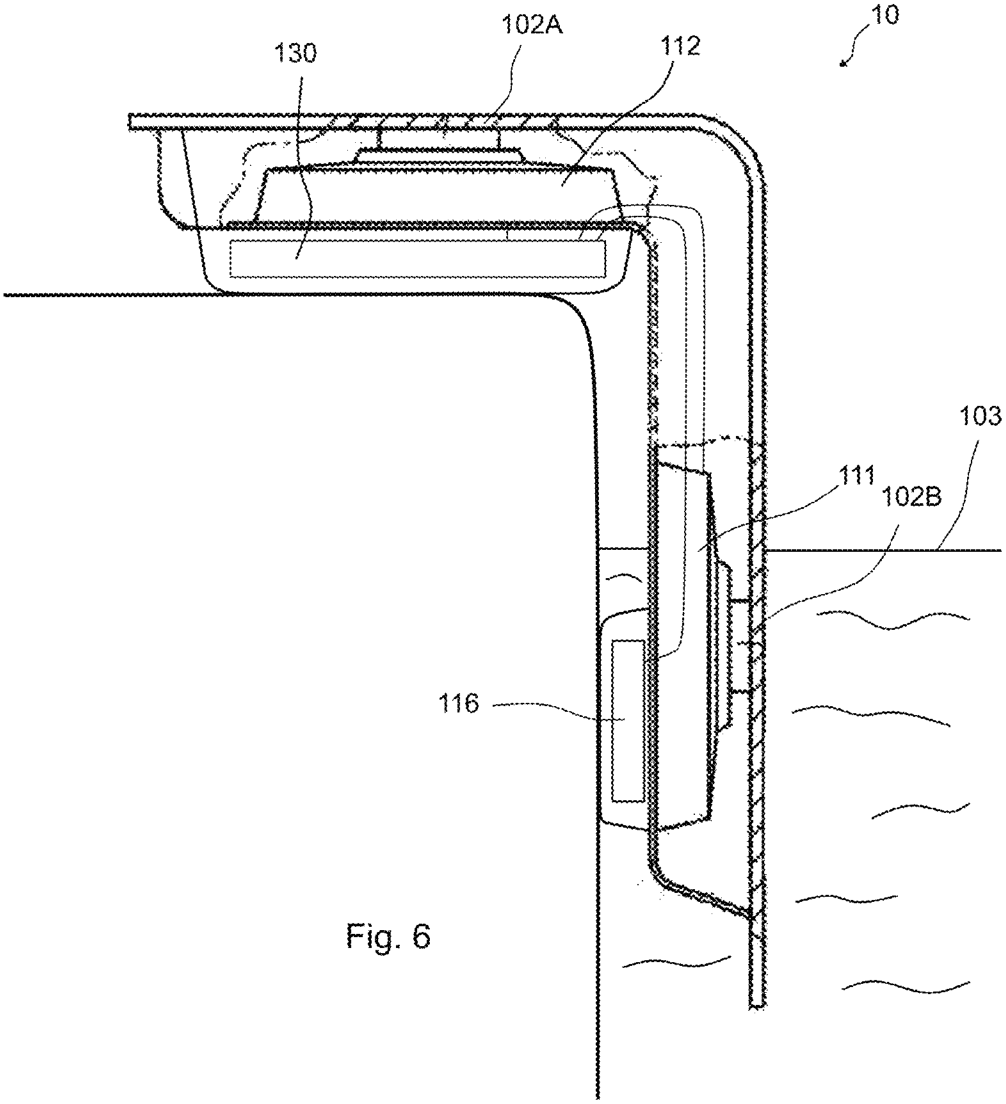
FIG. 6 shows a system according to a second embodiment of the invention.

FIG. 6 illustrates a sound system 10 according to a second embodiment of the invention, with a configuration similar to that of the system according to FR 3098833 A1, but which differs from the sound system according to the first embodiment by its shape and the fact that it is primarily intended for use on the edge of a pool.

Thus in a similar way to the system according to document FR 3098833 A1, the sound system 10 is presented in a general L shape with:

- the base of the L presenting the second wall 102A which is intended to be above water,
- the longitudinal portion of the L with the first wall 101A, which is intended to be partially submerged.

On the other hand, in contrast to the teachings of document FR 3098833 A1 and in accordance with the invention, in the present embodiment, the control unit 130, including in particular the radio-frequency communication module 131, with its antenna, is arranged in the base of the L which is intended to come to rest on the edge of the pool 1 and thus to remain above water. This configuration ensures a wireless connection that is not disrupted by the water in the pool 1.

Of course, in accordance with the teaching of FR 3098833 A1, the system may comprise a buoyancy adjustment system 116, such as a ballast, to ensure that the sound system 10 is held securely on the edge of the pool 1 while allowing easy movement along the edge of the pool 1. In order to adjust the arrangement of the first wall 101A with respect to the waterline, in accordance with the variant described in document FR 3098833 A1, the longitudinal portion of the L of the sound system 10 according to this second embodiment can offer depth adjustment in the pool 1, for example by means of a telescopic portion or a portion made of elastic material. Similarly, in place of the buoyancy adjustment system 116, the sound system may comprise a ballast to ensure that it stays fixed on the edge of the pool 1, or a suction cup system.

As indicated above in the general framework of the invention, it is of course conceivable that the two parts of the L of the sound system 10 can be detached from each other, while remaining connected preferably by a wired connection, or, in the case where the processing unit 130 is arranged in two sub-processing units able to be connected together with a wireless connection, by a wireless connection.

According to this latter variant, each of its processing sub-units equips a respective part of the sound system 10. Of course, in such a configuration, in accordance with the invention, each of its processing sub-units comprises a respective antenna arranged in such a way that said antenna is at least partly above the waterline 3 of the pool when the sound system is arranged at least partly in the pool 1. It should be noted that, given the variant offered by the buoyancy adjustment system of this second embodiment, the part of the sound system 10 having the first wall 101A and corresponding to the longitudinal portion of the L can be buoyant when detached from the part of the sound system 10 having the second wall 102A.

The invention claimed is:

1. A sound system (10) for a pool (1) comprising:

at least a first wall (101A) and a second wall (102A), the first and second walls (101A, 102A) being arranged in such a way that, when the sound system (10) is in use, one of the first and second walls (101A, 102A) is at least partly submerged in the pool (1), while the other of the first and second walls (101A, 102A) is above water, a first electroacoustic transducer (111) attached to the first wall (101A) and a second electroacoustic transducer (112) attached to the second wall (102A), a control unit (130) configured to control and power the first and second electroacoustic transducers (111, 112), the control unit (130) comprising a radio-frequency communication module (131), including at least one antenna (131A) arranged in the sound system in such a way that the antenna is at least partly above a waterline (3) of the pool when the sound system is arranged at least partly in the pool (1), the sound system being buoyant and having at least a first waterline when arranged in the pool, wherein the at least one antenna is arranged at least partly above the first waterline of the sound system, wherein the sound system has at least a first configuration wherein the first wall (101A) is at least partly submerged, the second wall (102A) being above water, and a second configuration wherein the first wall (101A) is partly above water, the second wall (102A) being at least partly submerged, the sound system (10) having:

the first waterline (11A) when arranged in the pool in the first configuration, and a second waterline when arranged in the pool in the second configuration, and wherein the at least one antenna (131A) is arranged so as to present:

a first portion above the first waterline when the sound system (10) is arranged in the pool in the first configuration, and a second portion, separate from or partly coinciding with the first portion, above the second waterline when the sound system (10) is arranged in the pool in the second configuration.

2. The sound system (10) according to claim 1, wherein the control unit (130) comprises a signal processing module (134) configured to receive the audio signal from the wireless communication module (131) and to apply different audio processing to the signal between the first and second transducers so as to provide a control audio signal with processing adapted to the aquatic environment to whichever transducer, either the first or second (111, 112), is associated with whichever wall, either the first or second (101A, 101B), is at least partly below the waterline.

3. The sound system (10) according to claim 1, wherein the processing module (133) has a first processing configuration wherein the control audio signal is transmitted to the first transducer (111) with processing adapted to the aquatic environment, and a second processing configuration wherein the control audio signal is transmitted to the second transducer (111) with processing adapted to the aquatic environment.

4. The sound system (10) according to claim 3, wherein the control module (130) comprises at least one sensor capable of detecting which of the first and second configurations the sound system (10) is in, and wherein the processing module (133) is configured to:

switch from the first processing configuration to the second processing configuration when the sensor (134) detects that the sound system (10) has switched from the first configuration to the second configuration, and switch from the second processing configuration to the first processing configuration when the sensor (134) detects that the sound system (10) has switched from the second configuration to the first configuration.

5. The sound system (10) according to claim 1, wherein the control module (130) comprises at least one internal energy source (132) capable of providing an electrical supply to power the rest of the control module (130).

6. The sound system (10) according to claim 5, wherein the at least one internal internal energy source (132) is rechargeable and wherein the control module comprises at least one of:

a solar charging system, and an inductive charging system (135).

7. The sound system (10) according to claim 1, wherein at least one of the first and second walls (101A, 102A) is equipped with a lighting system.

8. The sound system according to claim 7, wherein said at least one of the equipped first and second walls (101A, 102A) is configured to be submerged to allow lighting of a pool bottom.

9. A pool comprising a sound system (10) according to claim 1.

* * * * *